(12) United States Patent
Jones et al.

(10) Patent No.: US 6,228,309 B1
(45) Date of Patent: May 8, 2001

(54) METHOD AND APPARATUS FOR INJECTION MOLDING INCLUDING VALVE STEM POSITIONING

(75) Inventors: Trefor T. Jones, Bloomfield Hills, MI (US); Jacek Kalemba, Mississauga; Robert D Schad, Toronto, both of (CA); Stefan Von Buren, Colchester, VT (US)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/218,469

(22) Filed: Dec. 22, 1998

(51) Int. Cl.⁷ .................................................. B29C 45/23
(52) U.S. Cl. ....................................... 264/328.8; 425/564
(58) Field of Search .............................. 264/328.1, 328.8, 264/328.9, 40.1, 40.7; 425/562, 563, 564, 572, 573, DIG. 129, DIG. 5, 145

(56) References Cited

U.S. PATENT DOCUMENTS

| | | | |
|---|---|---|---|
| 3,241,191 | * | 3/1966 | Nouel . |
| 3,252,184 | | 5/1966 | Ninneman . |
| 3,561,062 | | 2/1971 | Goron . |
| 4,088,271 | * | 5/1978 | Flygenring ........................... 425/562 |
| 4,279,582 | | 7/1981 | Osuna-Diaz . |
| 4,330,258 | | 5/1982 | Gellert . |
| 4,333,608 | * | 6/1982 | Hendry ................................. 425/563 |
| 4,380,426 | | 4/1983 | Wiles . |
| 4,420,452 | | 12/1983 | Van Dalen et al. . |
| 4,592,711 | | 6/1986 | Capy . |
| 4,917,502 | * | 4/1990 | Proksa et al. . |
| 4,966,545 | * | 10/1990 | Brown et al. .......................... 425/557 |
| 5,067,893 | | 11/1991 | Osuna-Diaz . |
| 5,141,696 | | 8/1992 | Osuna-Diaz . |
| 5,143,733 | * | 9/1992 | Von Buren et al. ............... 264/328.8 |
| 5,200,207 | * | 4/1993 | Akselrud et al. ..................... 425/557 |
| 5,288,225 | * | 2/1994 | Schmidt et al. ...................... 425/564 |
| 5,556,582 | | 9/1996 | Kazmer . |
| 5,670,190 | * | 9/1997 | Osuna-Diaz .......................... 425/564 |
| 5,780,077 | | 7/1998 | Von Holdt . |
| 5,849,236 | | 12/1998 | Tatham . |
| 5,891,381 | * | 4/1999 | Bemis et al. ....................... 264/328.8 |

FOREIGN PATENT DOCUMENTS

| | | |
|---|---|---|
| 0480223 | 4/1992 | (EP) . |
| 0635350 | 1/1995 | (EP) . |
| 62-41851 | 9/1987 | (JP) . |

* cited by examiner

Primary Examiner—Jill L. Heitbrink
(74) Attorney, Agent, or Firm—Bachman & LaPointe, P.C.

(57) ABSTRACT

Improved method and apparatus for injection molding particularly useful with multiple hot runner valve gates to fill a single large mold cavity. A hot runner injection nozzle is provided having a gate through which melt is injected into a mold cavity, and a valve stem is movable on the injection nozzle between an open position permitting flow of melt through the gate and a closed position blocking the flow of melt through the gate. The valve stem is movable to at least one position between the open and closed positions restricting the flow of melt through the valve gate.

24 Claims, 12 Drawing Sheets

METHOD AND APPARATUS FOR INJECTION MOLDING INCLUDING VALVE STEM POSITIONING

BACKGROUND OF THE INVENTION

It is known to employ multiple hot runner valve gates to fill large mold cavities. It is also known to employ sophisticated automatic control for the opening and closing of the multiple valves in sequence in order to optimize the filling and packing of the large mold cavities and in response to cavity pressure sensor signals. The present invention provides a simple, inexpensive and easily utilized improvement particularly useful with such multiple hot runner valve gates for filling such large cavity molds.

U.S. Pat. No. 4,420,452 to van Dalen et al. teaches the sequential feeding of resin through a series of hot runner valves to fill a single large cavity mold. The valves are disclosed as being pneumatically, hydraulically or electrically opened and closed in any desired sequence using a process computer, although the details of how the valves are controlled and the design of the valves themselves are not shown. U.S. Pat. No. 5,556,582 to Kazmer teaches two hot runner valve gates, each with servo-hydraulic controlled valve stems that respond to a closed loop control system sensing melt pressure in the mold cavity for filling a single large mold cavity. During molding, the valves are adjusted based on information from the sensor. However, this automatic system is very expensive to build and requires a computer to be programmed to process sensing data in order to provide control signals to the servo controlled valves.

Other references teach various ways for mechanically adjusting the closing or opening position of hot runner valve stems in single or multi-cavity molds. U.S. Pat. No. 3,491,408 to Notkins teaches a manually adjustable threaded stop for setting opening position. U.S. Pat. No. 3,252,184 to Ninneman shows a hot runner injection orifice control with adjustable valve stem control for each nozzle feeding its own cavity using spring closing and fluid pressure opening against a preset stop. U.S. Pat. No. 3,561,062 to Goron teaches an injection molding nozzle with a flow-control mechanism within each nozzle employing a rotatable nozzle which can be progressively turned to regulate the flow of resin into the mold cavity. U.S. Pat. Nos. 5,067,893 and 5,141,696 to Osuna-Diaz show injection molding devices having actuation systems for operation of a shut-off valve stem movably mounted in a valve gate employing a worm/gear drive for controlling the valve stem position. U.S. Pat. No. 5,780,077 to von Holdt teaches a worm/gear drive for adjusting a nozzle opening that does not include a valve stem. U.S. Pat. No. 4,330,258 to Gellert shows a mechanical double acting mechanism for actuating valve stems in valve gated injection molding systems. U.S. Pat. No. 4,088,271 to Flygenring shows a still further embodiment for mechanically adjusting the valve stem position.

Individual control of multiple hot runner valve gates each supplying its own mold cavity are taught by U.S. Pat. 4,279,582 to Osuna-Diaz which shows a hydraulic system and U.S. Pat. No. 4,592,711 to Capy which teaches a worm/gear method for rotating the nozzle to block the supply channel flow in combination with a two position actuated valve stem for sequentially feeding multiple mold cavities.

None of the foregoing mechanical valve stem position control means contemplate a predetermined intermediate settable position for the valve stem wherein the rate of resin flow filling the mold cavity is altered by moving the valve stem to said predetermined intermediate settable position during filling, particularly to restrict the flow of melt through the valve gate. Such a system would be highly desirable.

Japanese Patent 62-41851 teaches a rack/gear driven method for driving a valve stem in a coinjection nozzle to one of three positions to select which of the two melt channels can fill the mold cavity. While this reference teaches an intermediate valve stem position, it is for the purpose of blocking or unblocking a second resin supply channel in a coinjection nozzle and it does not contemplate altering the flow rate of a single resin supply channel during the filling process.

It is, therefore, the principal object of the present invention to provide an improved injection method and apparatus employing a hot runner injection nozzle having a gate through which melt is injected into a mold cavity.

It is a further object of the present invention to provide a method and apparatus as aforesaid which permits the altering of a single melt supply channel during the mold cavity filling process.

It is a still further object of the present invention to provide a method and apparatus as aforesaid which is particularly useful with multiple hot runner valve gates to fill single large mold cavities.

Further objects and advantages of the present invention will appear hereinbelow.

SUMMARY OF THE INVENTION

In accordance with the present invention, the foregoing objects and advantages, as well as others to be described hereinbelow, are readily obtained.

The injection molding apparatus of the present invention comprises: a hot runner injection nozzle having a valve gate through which melt is injected into a mold cavity; a valve stem movable in said injection nozzle between an open position permitting the flow of melt through said gate and a closed position blocking flow of melt through said gate; and means for holding the valve stem at least at one position between the open and closed positions restricting the flow of melt through said valve gate. The present invention is particularly applicable to such an apparatus including a large mold cavity which is supplied with melt with at least two of said injection nozzles, valve stems and said means for holding each valve stem, for injecting melt into a single mold cavity.

The process of the present invention for injection molding comprises: injecting melt through a valve gate of a hot runner injection nozzle into a mold cavity; moving a valve stem in said injection nozzle between an open position permitting flow of melt through said gate and a closed position blocking flow of melt through said gate; and holding the valve stem at least at one position between the open and closed position to restrict the flow of melt through said valve gate. The present invention is particularly applicable to such a process including injecting melt through gates of at least two of said hot runner injection nozzles into a single mold cavity, moving and holding valve stems in said at least two injection nozzles to at least at said one position to restrict the flow of melt through the valve gates of said at least two injection nozzles.

The present invention advantageously provides a low cost, easily settable predetermined intermediate valve stem position so that resin flow rate filling a mold cavity can be changed during the filling/packing step of an injection molding process. The present invention is particularly suitable for use in large molds and therefore the adjustment of the valve stem in accordance with the present invention may advantageously be safely and conveniently performed by a drive means controlled from outside of the molding area. Further features and advantages will appear hereinbelow.

BRIEF DESCRIPTION OF THE DRAWINGS

The present invention will be more readily understandable from a consideration of the accompanying, illustrative drawings, wherein.

DETAILED DESCRIPTION OF PREFERRED EMBODIMENTS

Figure 1:
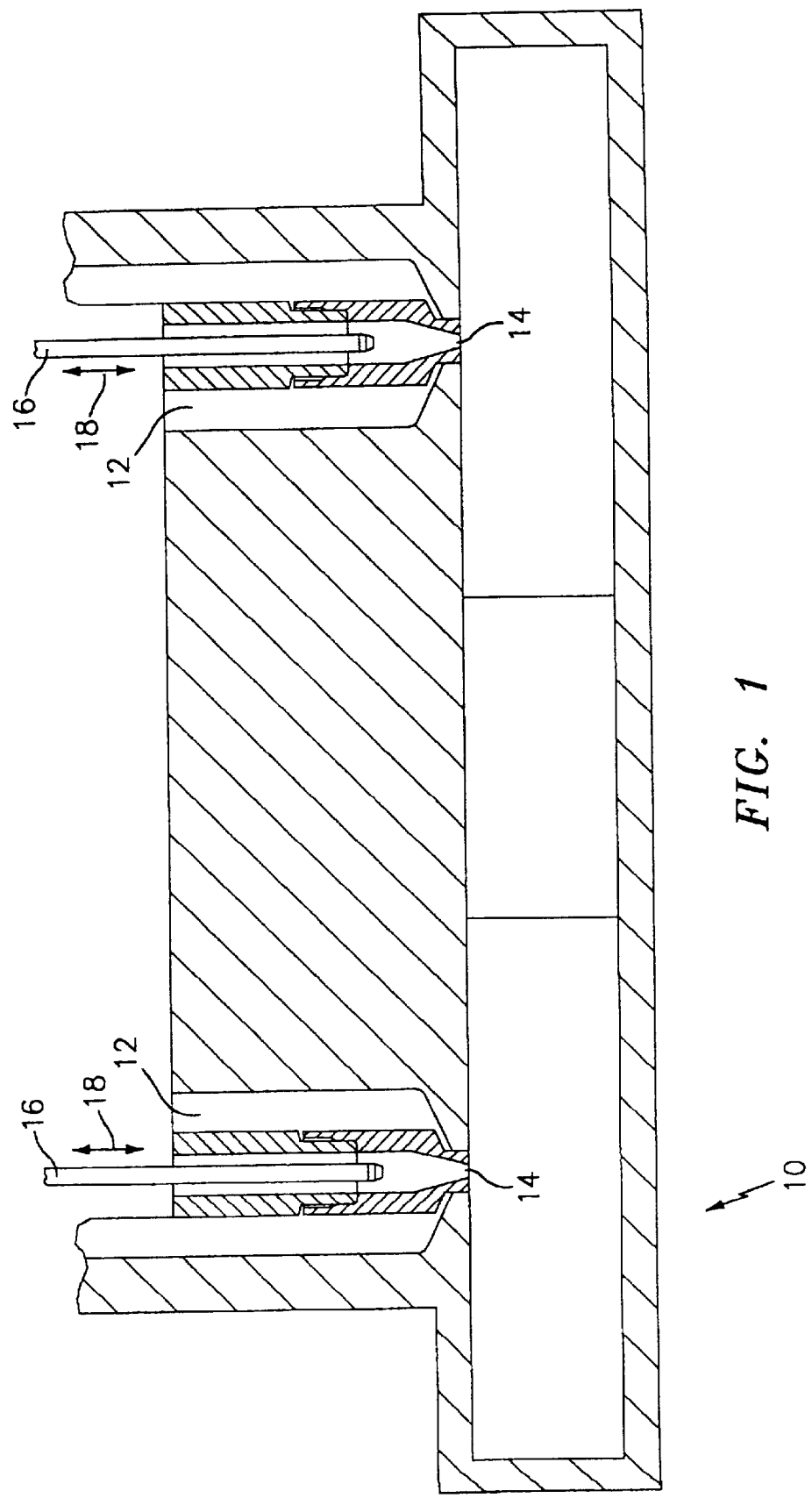
FIG. 1 is a partial sectional view through a large mold cavity with two hot runner injection nozzles of the present invention.

Referring to the drawings, FIG. 1 is a partly schematic partial sectional view through large mold cavity 10 with two hot runner injection nozzles 12, each of which includes valve gates or mold entry 14 and valve stems 16 movable in the direction of arrows 18 to open the valve gates as shown in FIG. 1 and thus permit the flow of melt through the valve gates into the mold, and to close the valve gates and thus block the flow of melt through the valve gates into the mold. The exact number of hot runner injection nozzles 12 employed will generally depend on the size of the mold, but one, two or three or more of said hot runner injection nozzles may be readily employed. Generally, the larger the mold, the more hot runner injection nozzles are employed.

The remaining Figures show the present invention, with a single hot runner injection nozzle being shown; however, it should be understood more than one nozzle may be used and that the other hot runner injection nozzles for a single system where used would generally have the same construction.

Figure 2:
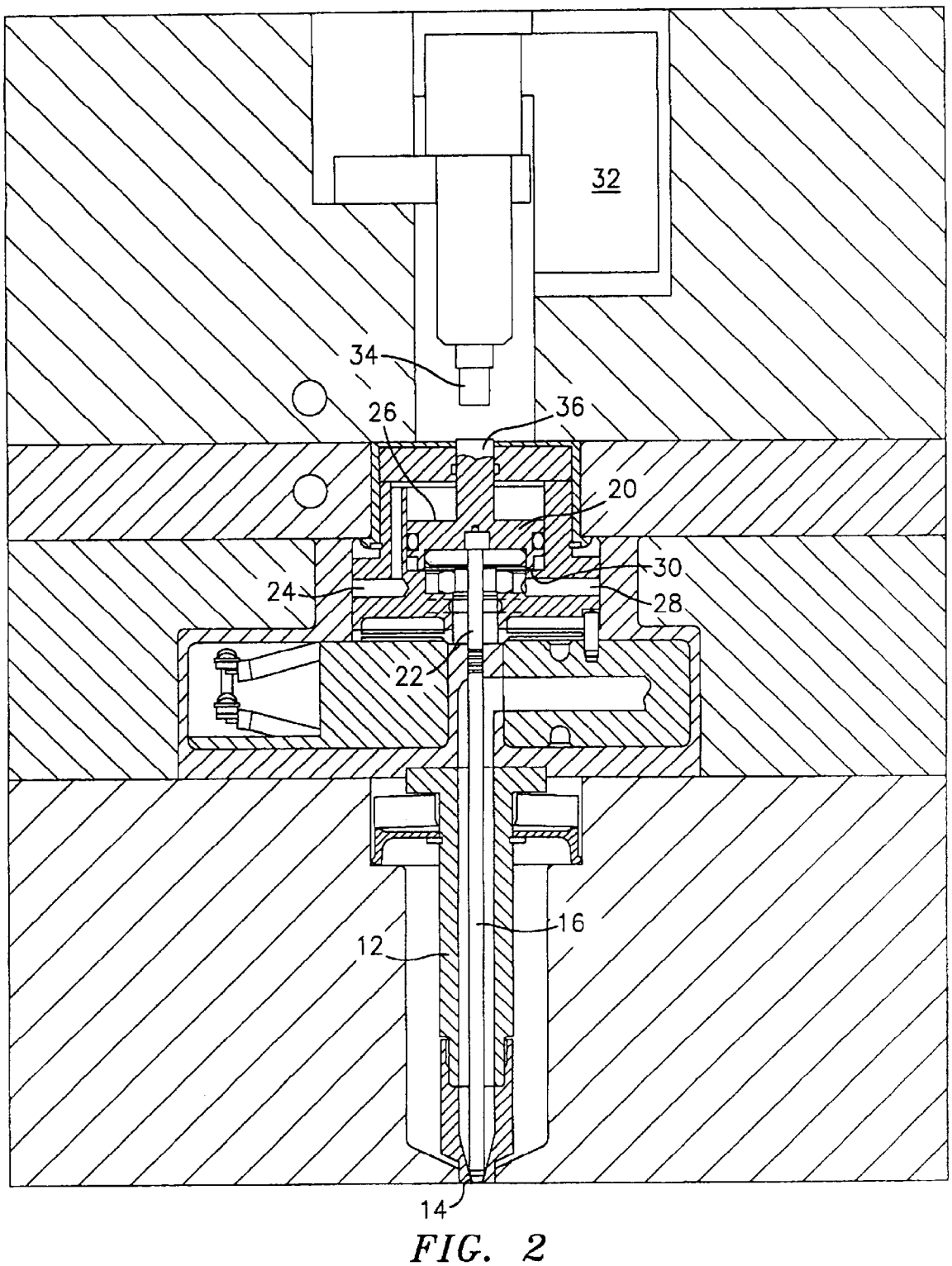
FIG. 2 shows a hot runner injection nozzle of the present invention with the valve stem in the fully closed position.
Figure 3:
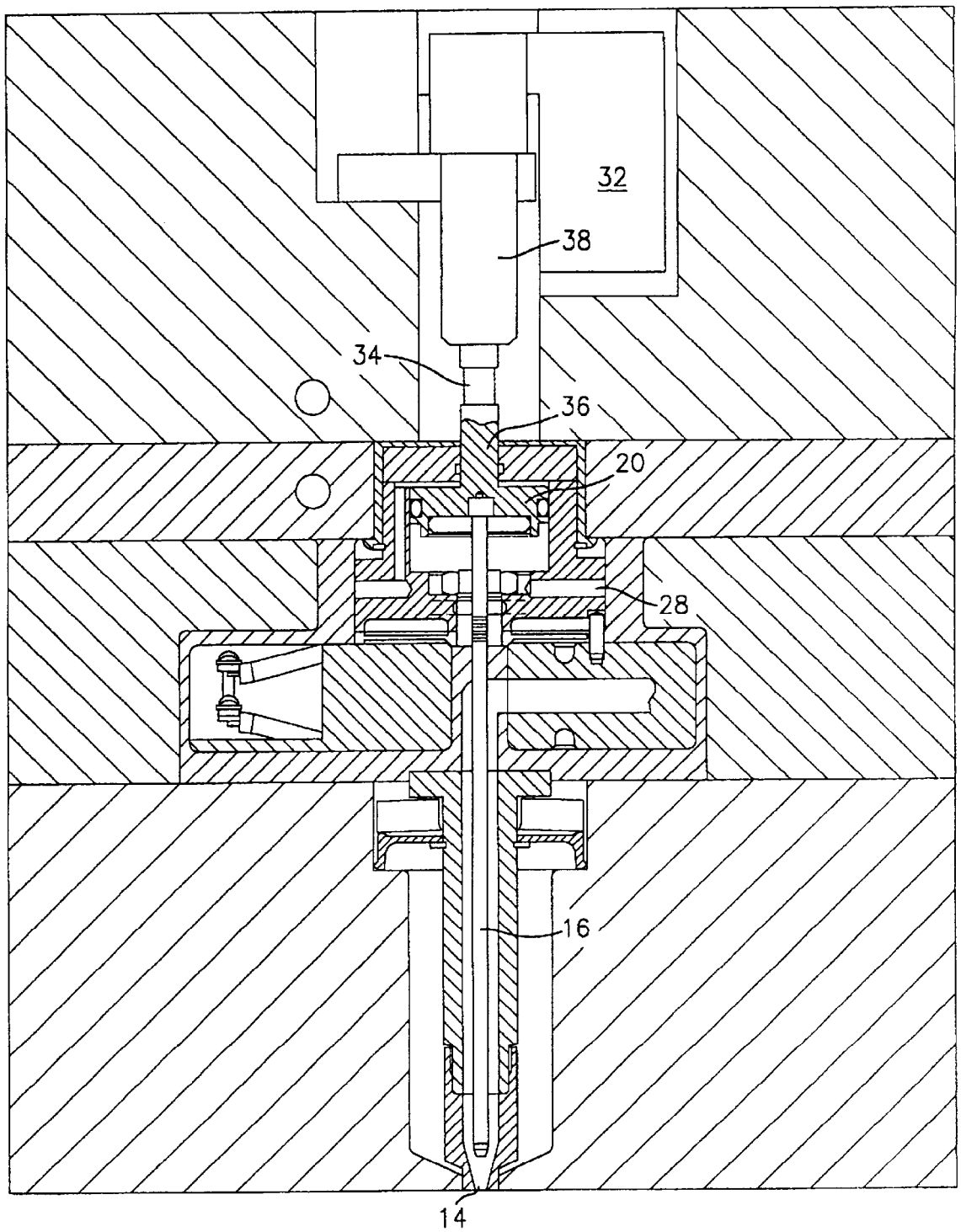
FIG. 3 shows the hot runner injection nozzle of FIG. 2 with the valve stem in the fully open position.
Figure 4:
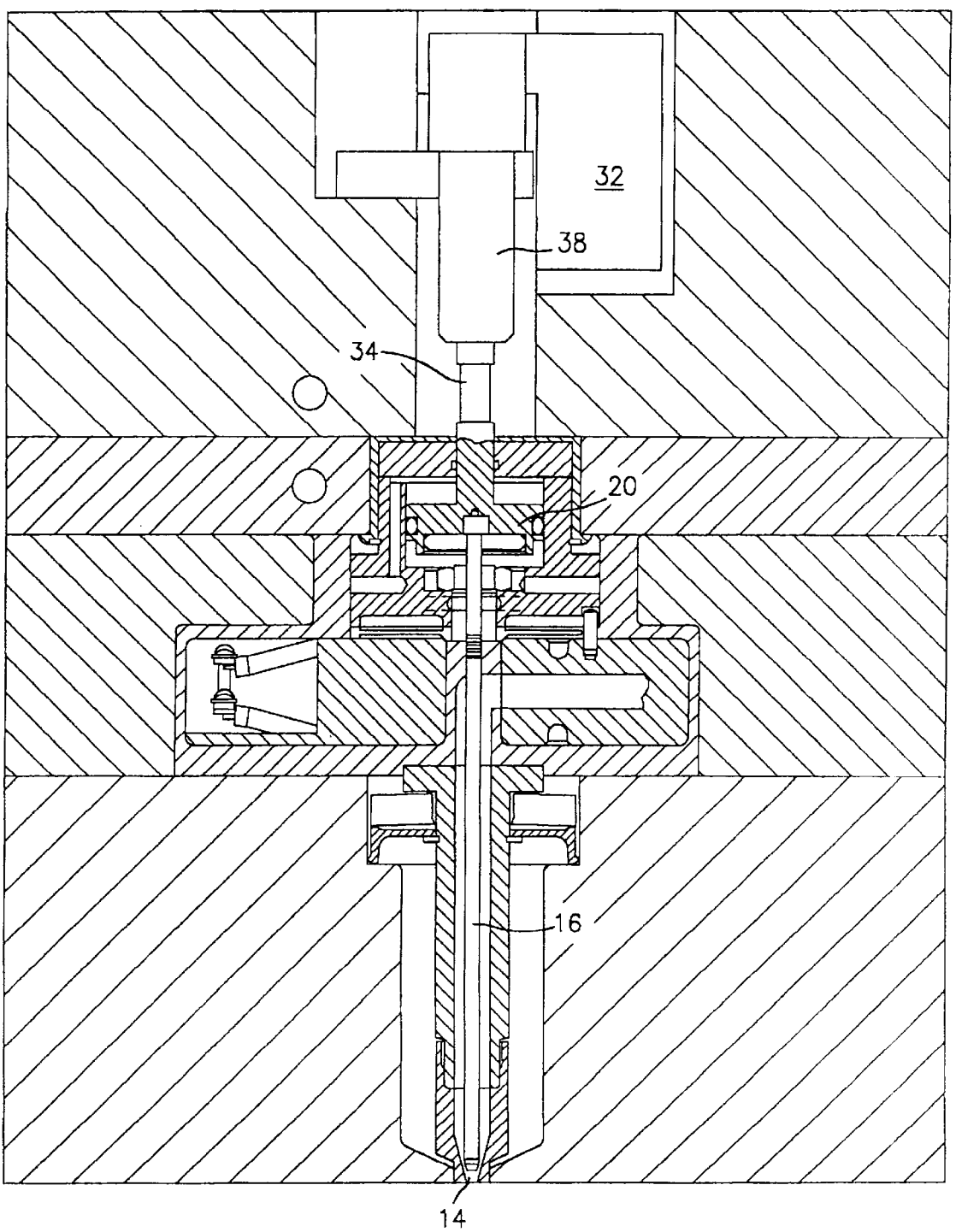
FIG. 4 shows the hot runner injection nozzle of FIG. 2 with the valve stem at an intermediate position.

Referring to the embodiment of FIGS. 2–4, FIG. 2 shows hot runner injection nozzle 12 with the valve stem 16 thereof in the fully closed position blocking valve gate 14 and thus preventing melt from flowing past the valve gate into the mold cavity. Double acting air piston 20 is affixed to upper end 22 of valve stem 16 and is operative to move the valve stem, but naturally other means may be provided to move the valve stem. Air is supplied through air channel 24 to the upper end 26 of air piston 20 to advance valve stem 16 and thus close valve gate 14 as shown in FIG. 2. Air is supplied through air channel 28 to the lower end 30 of air piston 20 to cause the valve stem 16 to retract as shown in FIG. 3 and thus fully open the valve gate permitting flow of melt therethrough.

In accordance with the present invention, a motor means, such as a small, digitally controlled servo-electric linear actuator motor 32 is used to adjust stop means 34 in relation to the valve stem. Thus, valve stem 16 includes upper extension 36 which is spaced from stop 34 in the fully closed position shown in FIG. 2. FIG. 3 shows air supplied through air channel 28 causes valve stem 16 to retract until upper extension 36 contacts stop 34 which is set by actuator 32 in the fully open position, thus fully opening valve gate 14. In FIG. 4, after the resin delivery is almost complete through valve gate 16, actuator motor 32 is activated to advance stop arm 38 to advance stop 34 causing valve stem 16 to advance as shown to a position between the open and closed position. This results in a partial closing of the valve gate as shown in FIG. 4, thereby restricting the flow rate of resin into the mold cavity during the final stage of filling and packing the mold cavity, which is quite advantageous. Each stop means and stop arm is equipped with its own motor as shown in FIGS. 2–4 so that individual control can be used to set the exact desired position of the partially closed valve stem. This position may be determined empirically by examining the results of the molding produced as a result of the complete cycle. Each valve stem may be adjusted individually with motor settings based on the molding results obtained. Once a good molded part has been produced, the motors are controlled so as to repeat these optimum settings for all subsequent molding cycles in synchronism with the air valve controls and the molding cycle.

Another operating method would be to use the motor to adjust the full open position of the valve stem so that initially melt flow rate can also be altered in addition to the intermediate adjustment for controlling a second flow rate, i.e., a second intermediate position can be readily be provided.

The present invention is simple, convenient and low cost. Moreover, the valve stem position can be controlled to within + or –0.001 inch, which is accurate enough for most applications.

FIGS. 5–8 show an alternate embodiment of the present invention, with like reference numerals referring to like components.

Figure 5:
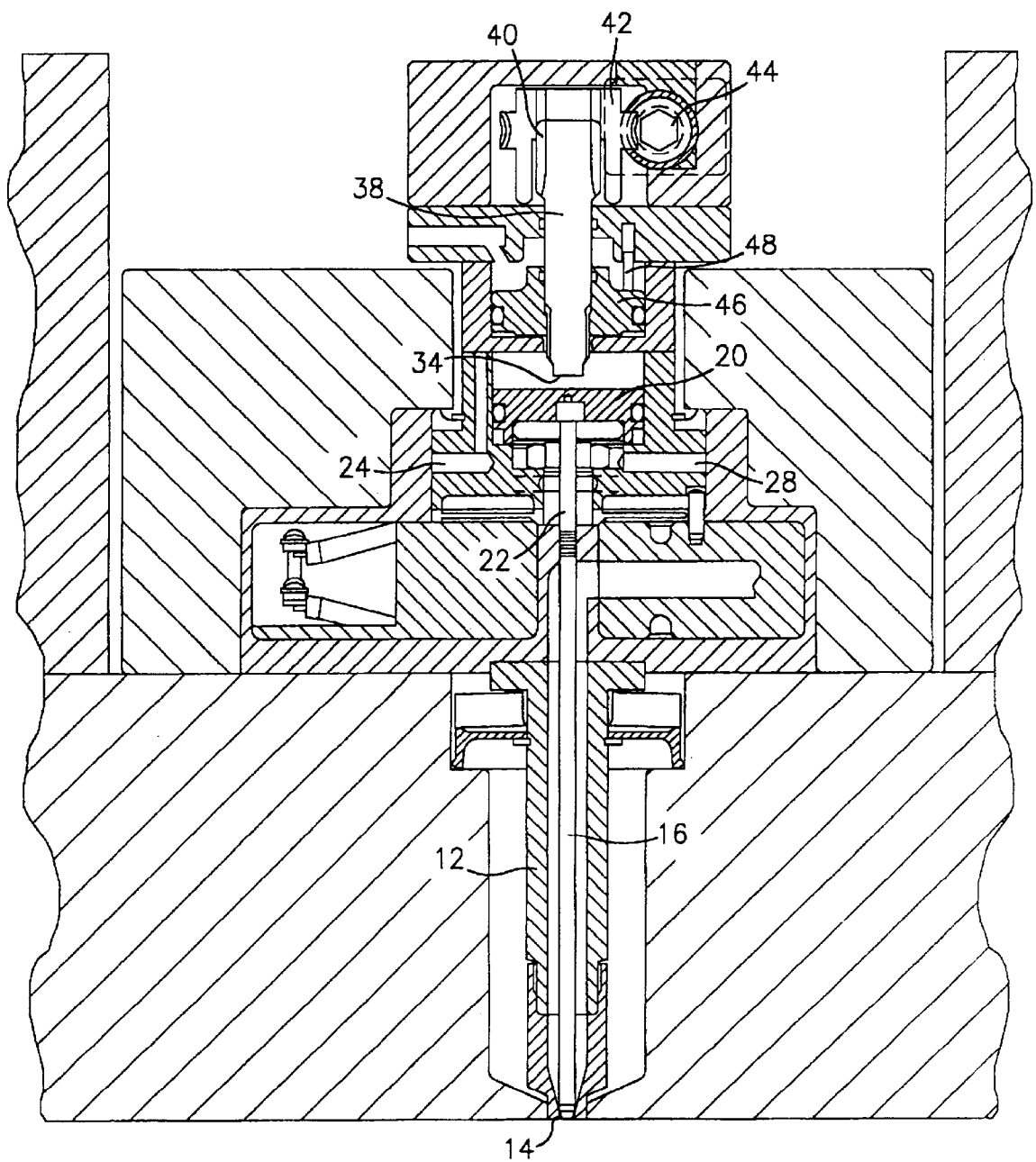
FIG. 5 shows an alternate embodiment of a hot runner injection nozzle of the present invention with the valve stem in the fully closed position.

FIG. 5, similar to FIG. 2, shows hot runner 12 with the valve stem 16 thereof in the fully closed position. Double acting air piston 20 is operative to move the valve stem between the open and closed positions, with FIG. 5 showing the fully closed position. Air is supplied through air channel 24 to advance valve stem 16 and thus close valve gate 14, and through air channel 28 to retract valve stem 16, as in the embodiment of FIGS. 2–4.

FIG. 5 also employs stop arm 38 with movable stop means 34 at the end thereof facing the upper end 22 of valve stem 16, as in FIGS. 2–4. However, stop arm 38 has a splined upper end 40 that engages gear 42 which in turn is driven by worm 44. Stop arm 38 is also threaded into piston 46 that is prevented from rotating by pin 48 or the like means. Turning the worm 44 by a motor (not shown) in a known fashion moves the stop arm and thus causes piston 46 and stop 34 to move, thereby setting the intermediate stop position.

Figure 6:
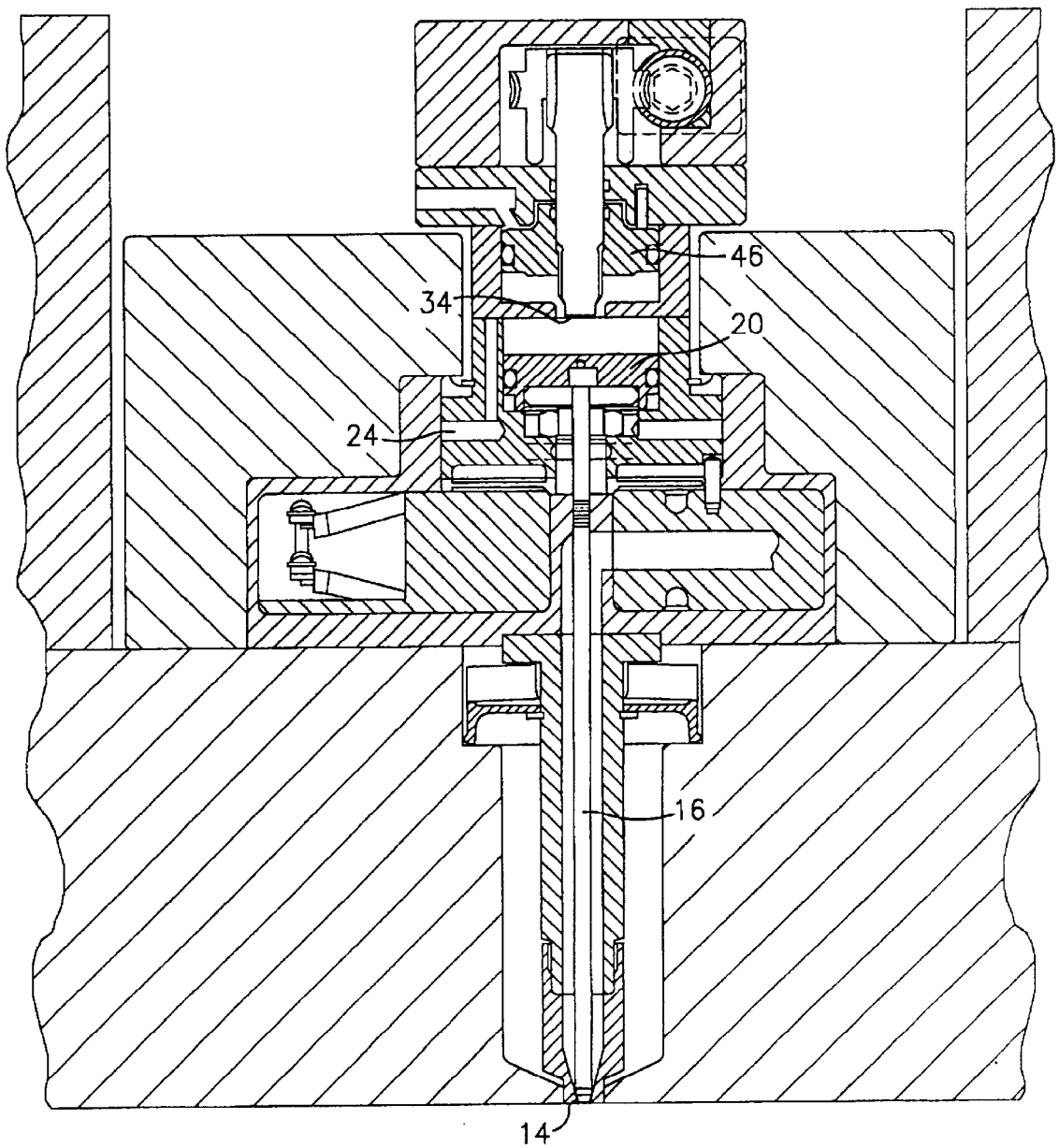
FIG. 6 shows the hot runner injection nozzle of FIG. 5 with the valve stem fully closed and the stop retracted.
Figure 7:
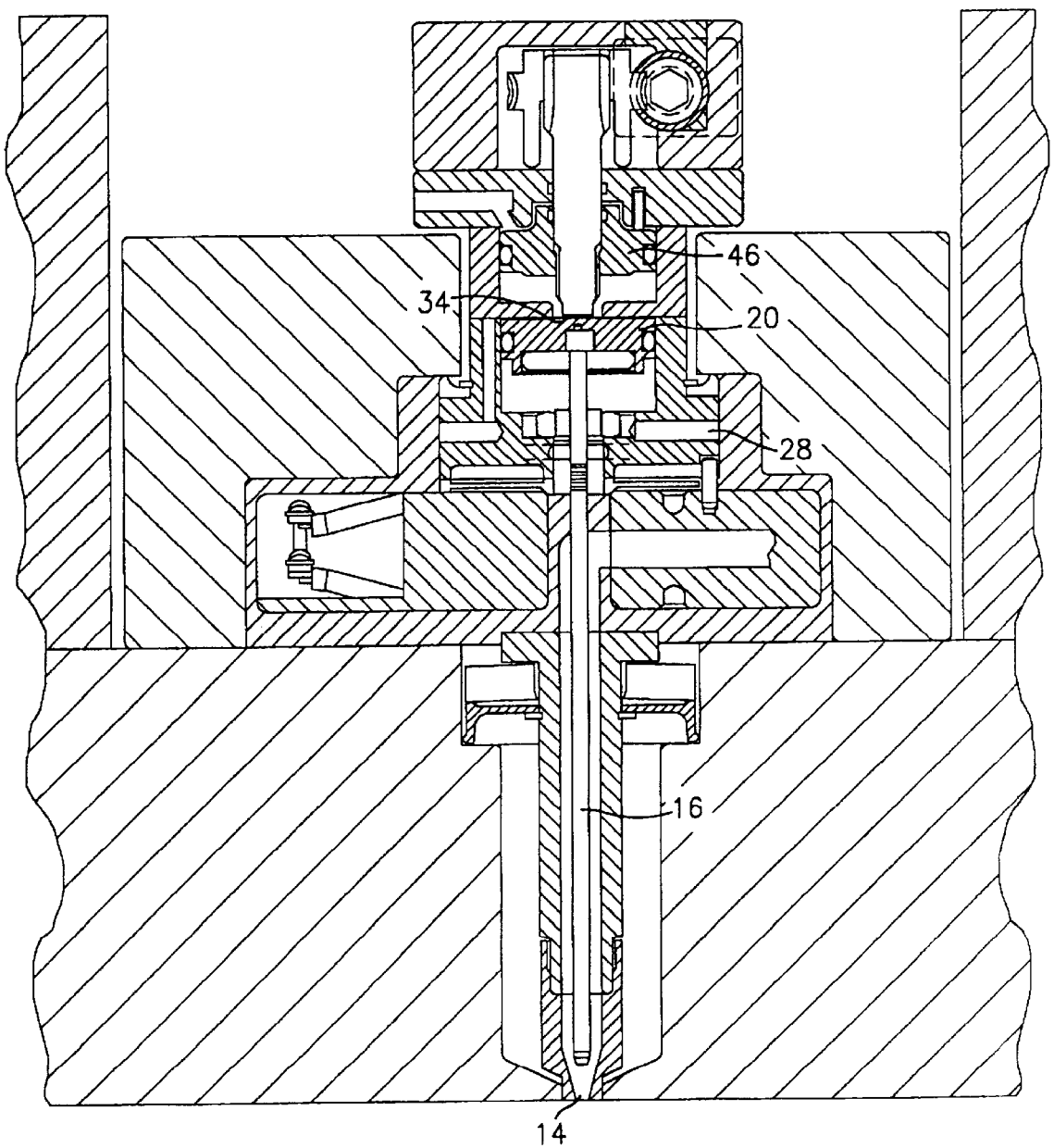
FIG. 7 shows the hot runner injection nozzle of FIG. 5 with the valve stem in the fully open position.
Figure 8:
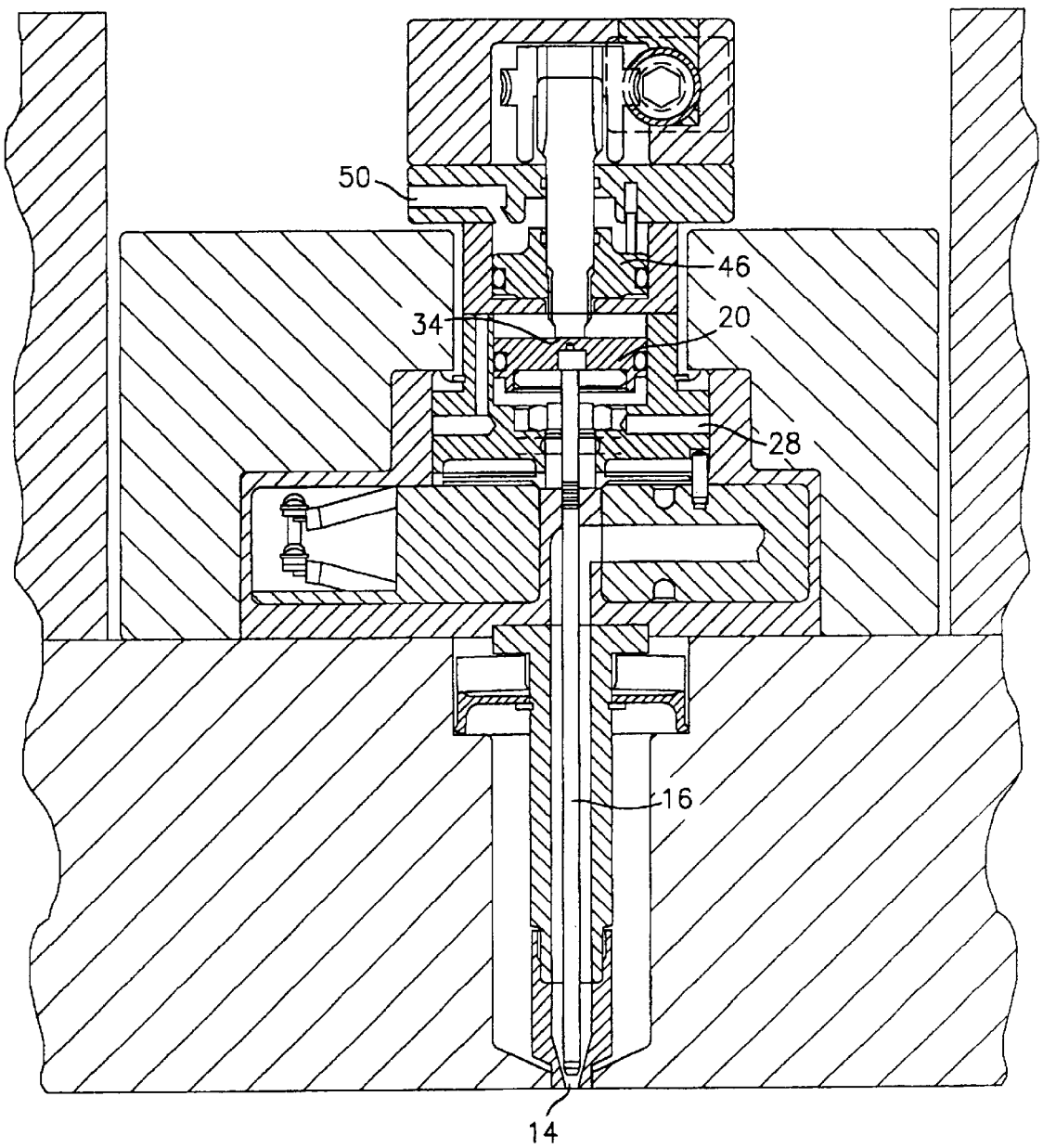
FIG. 8 shows the hot runner injection nozzle of FIG. 5 with the valve stem at an intermediate position.

Thus, in operation, FIGS. 5–6 show the valve stem 16 in the fully closed position. FIG. 5 shows stop 34 in the advanced position and FIG. 6 shows stop 34 in the retracted position. In operation, referring to FIG. 6, air is supplied through air channel 24 that acts on both pistons 46 and 20 causing the pistons to separate from each other as far as possible and causing valve stem 16 to fully close valve gate 14. FIG. 7 shows air being supplied to air channel 28 causing piston 20 to retract and fully open valve gate 14. FIG. 8 shows air supplied to both air channels 28 and 50, causing piston 46 to advance so as to engage stop 34 with piston 20, which is in turn urged back into contact with stop 34 by air supplied through channel 28. This results in control of the intermediate position of valve stem 16 as shown in FIG. 8.

The advantage of this approach is that once the intermediate stop position has been set by means of the worm/gear arrangement, this mechanism is not needed for operation during molding. The positions of the valve stem are all actuated by means of the two air pistons.

Figure 9:
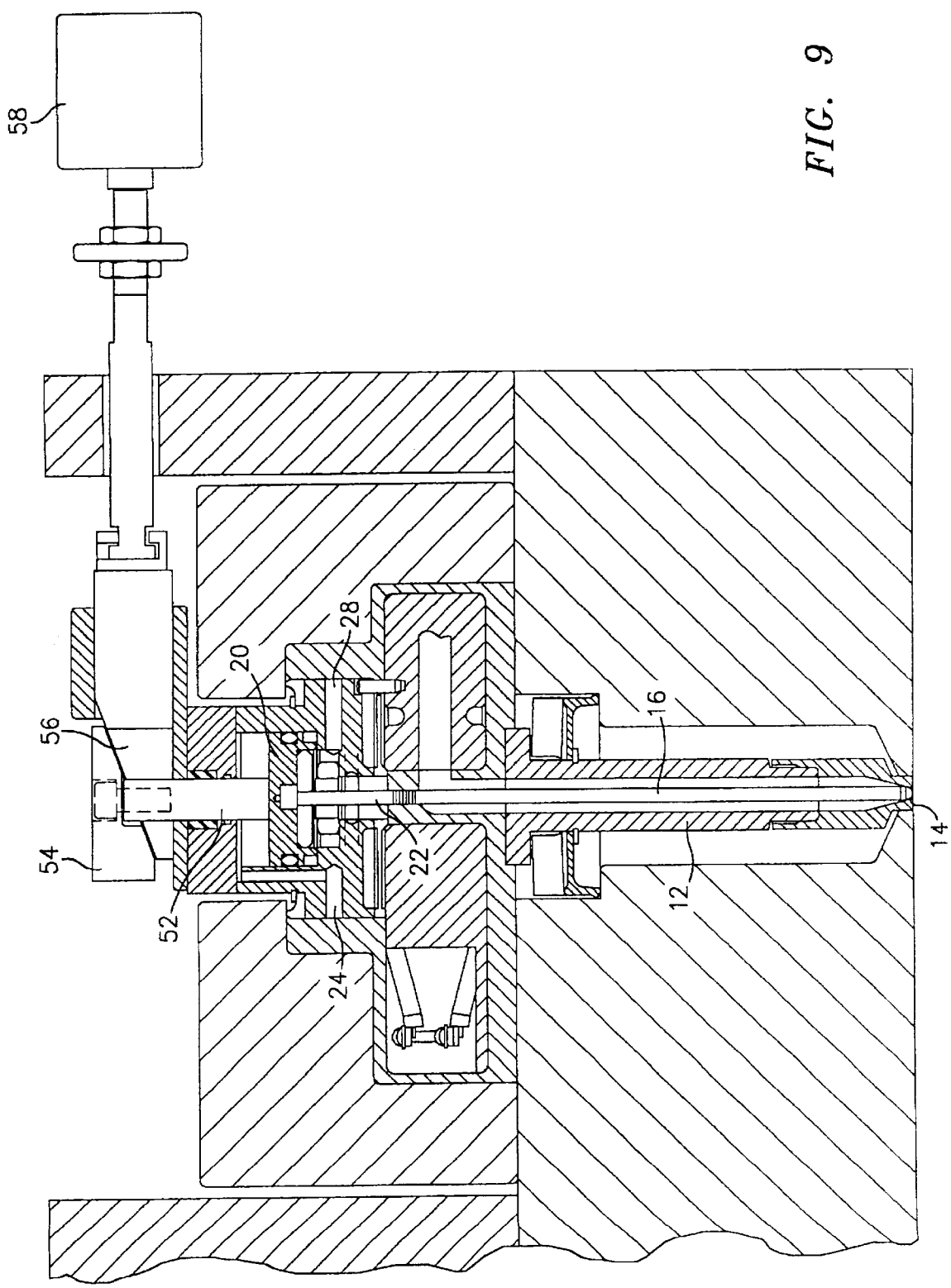
FIG. 9 shows a still further embodiment of a hot runner injection nozzle of the present invention with the valve stem in the fully closed position.
Figure 10:
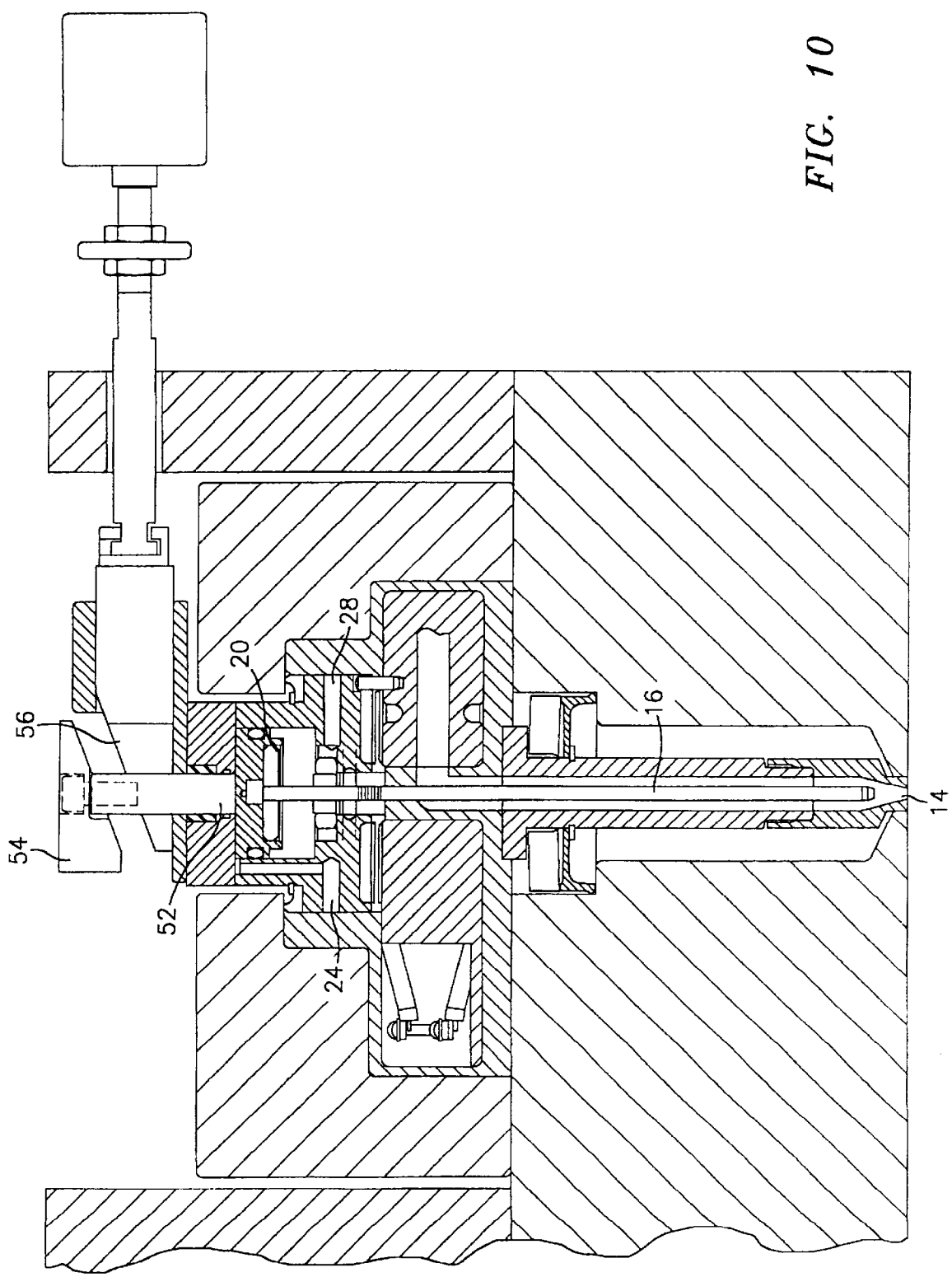
FIG. 10 shows the hot runner injection nozzle of FIG. 9 with the vale stem in the fully open position.
Figure 11:
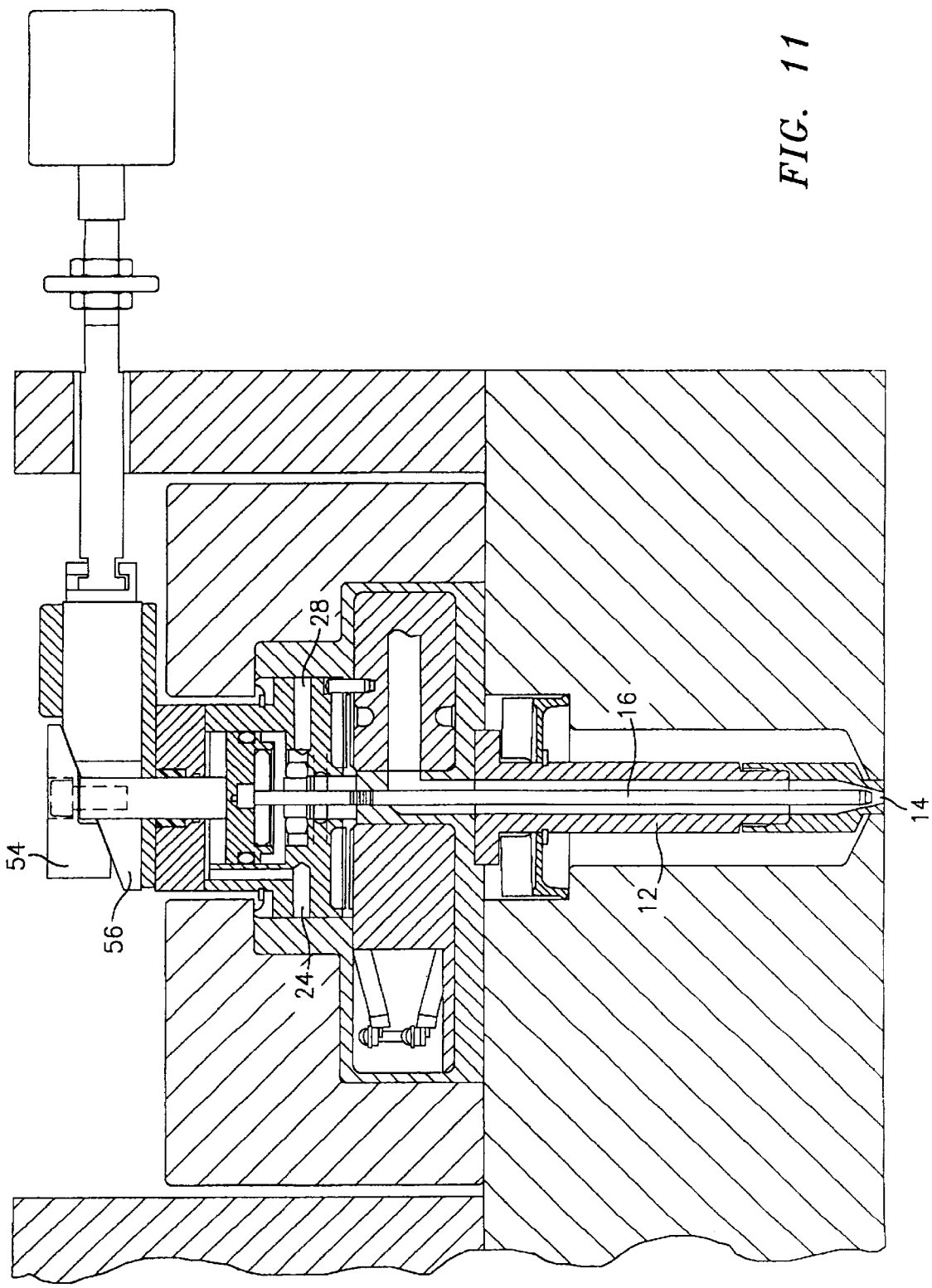
FIG. 11 shows the hot runner injection nozzle of FIG. 9 with the valve stem at an intermediate position.

FIGS. 9–11 show a still further embodiment of the present invention, with like reference numerals showing like components.

FIG. 9, similar to FIGS. 2 and 5, shows hot runner 12 with the valve stem 16 thereof in the fully closed position. Double acting air piston 20 is operative to move the valve stem between the open and closed positions, with FIG. 9 showing the fully closed position. Air is supplied through air channel 24 to advance valve stem 16 and thus close valve gate 14, and through air channel 28 to retract valve stem 16, as in the previous embodiments.

However, FIG. 9 employs a wedge for effecting the intermediate position of the valve stem.

Referring to FIG. 9, valve stem 16 includes arm 52 extending above air piston 20 and connected to first wedge 54. Second wedge 56 driven by piston 58 contacts first wedge 54 as shown in FIG. 9 in the mold closed position. In the fully open position shown in FIG. 10, air through air channel 28 moves valve stem 16 to the fully open position and also moves first wedge 54 upwardly away from valve gate 14. In the intermediate position shown in FIG. 11, second wedge 56 is moved laterally, air through air channel 24 moves valve stem 16 downwardly towards valve gate 14 and also moves valve stem arm 52 and first wedge 54 in the same direction. However, the second wedge 56 controls the downward movement of valve stem and positions the valve stem in the intermediate position.

Figures 12, 13:
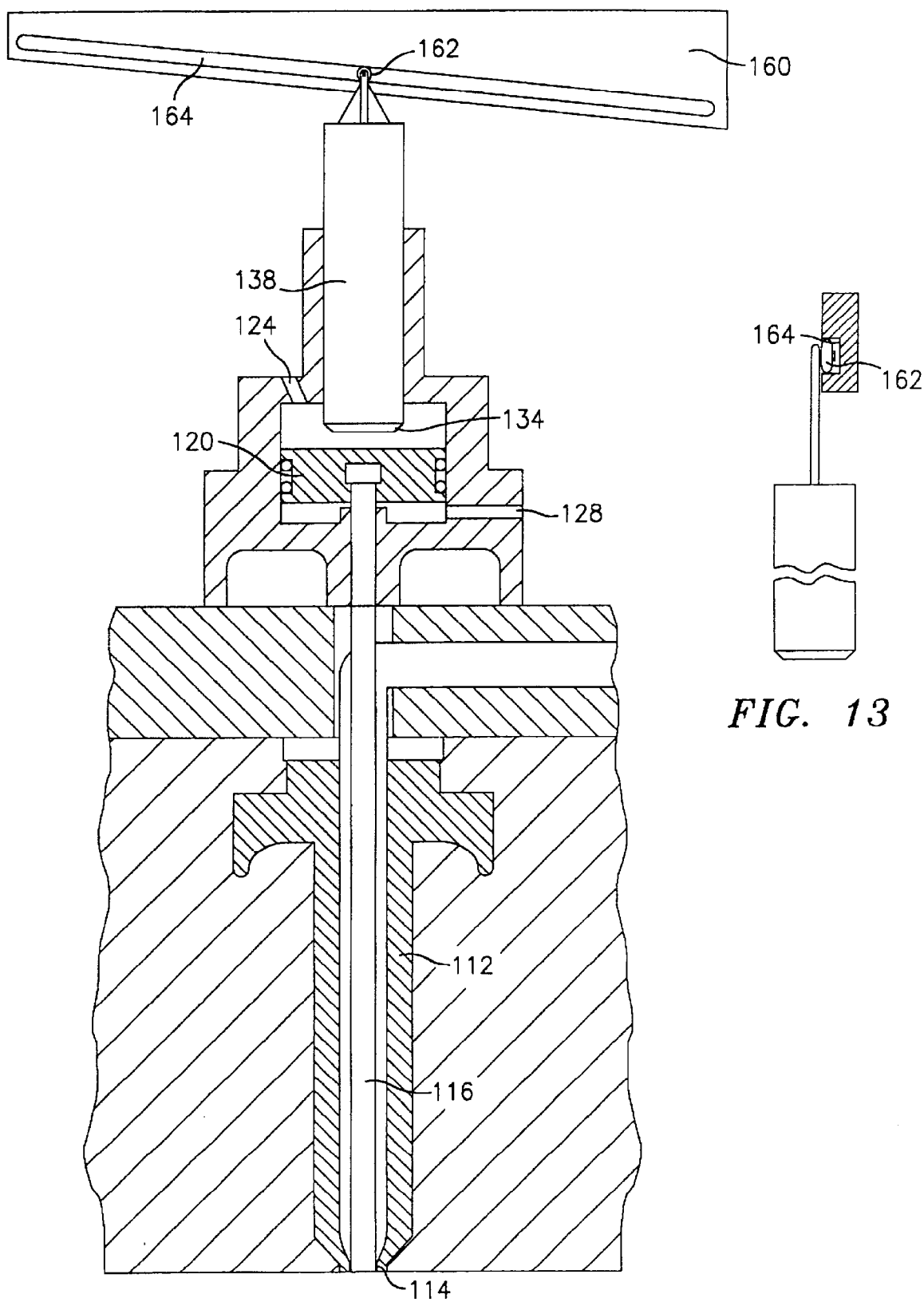
FIG. 12 shows a still further embodiment of the hot runner injection nozzle of the present invention with the valve stem in the fully closed position.
FIG. 13 is a detail of the cam plate assembly of FIG. 12.

FIGS. 12–13 show a still further embodiment of the present invention using a cam approach for controlling the intermediate position of the valve stem.

Referring to FIG. 12, hot runner injection nozzle 112 includes valve stem 116 and valve gate 114. Air piston 120 controls the movement of the valve stem between the open and closed position via air channels 124 and 128, with FIG. 12 showing the closed position. Stop means 134 is provided by stop arm 138 which is controlled by cam plate 160. Stop arm 138 and therefore stop means 134 is movable via roller 162 in roller guide 164, shown in more detail in FIG. 13, by motor means not shown, as for example by an air cylinder. Thus, stop means 134 engages air piston 120 to prevent complete opening of valve gate 114 and set the intermediate position. Naturally, several intermediate positions may be set by this embodiment as by stopping the roller in various positions in the roller guide in order to adjust the setting of the stop means. One can also conveniently provide steps in the roller guide to conveniently locate the roller at various locations in the roller guide.

The present invention obtains significant advantages. In addition to providing means to inexpensively and simply and effectively control the intermediate position or positions of a hot runner valve stem, the present invention also has the advantage of closing the valve stem by using an air piston. If stem closing was driven directly by a motor or mechanical gear drive, there is a risk of over stroking the stem and deforming the fragile gate area. By completing the closing motion solely by using the air piston, this danger is avoided because the comparatively low force of the air piston allows the stem to stall when it contacts the gate area.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Process for injection molding, which comprises:
   injecting melt through a valve gate of a hot runner injection nozzle into a mold cavity;
   moving a valve stem in said injection nozzle between an open position permitting flow of melt through said gate and a closed position blocking flow of melt through said gate; and
   holding the valve stem at least at one position between the open and closed positions via an adjustable stop means during flow of said melt through said gate to restrict the flow of melt through said gate;
   including moving the valve stem between the open and closed positions by a double acting air piston, blocking movement of the valve stem by said stop means, and moving said stop means with a motor means separate from said air piston bidirectionally in relation to said valve stem to set said at least one position at any predetermined position between the open and closed positions.

2. Process according to claim 1, including injecting melt through gates of at least two of said hot runner injection nozzles into a single mold cavity, and holding valve stems in said at least two injection nozzles at least at said one position to restrict the flow of melt through the valve gates of said at least two injection nozzles.

3. Process according to claim 1, including blocking upward movement of said valve stem via said stop means, and moving said stop means via said motor means which thereby moves said valve stem to said at least one position.

4. Process according to claim 1, including providing a separate stop means and separate motor means for each of at least two injection nozzles, and separately adjusting each stop means in relation to said valve stems.

5. Process according to claim 1, including contacting an upper portion of said valve stem by said stop means.

6. Process according to claim 1, including said motor means moving said stop means by a mechanical actuator.

7. Process according to claim 1, including said motor means moving said stop means at least in part by a worm that engages and drives a gear.

8. Process according to claim 1, including said motor means moving said stop means at least in part by an air piston connected to said stop means.

9. Process according to claim 7, including the step of setting said at least one position by said worm and gear, and moving the stop means during molding by an air piston.

10. Process according to claim 1, wherein said stop means includes a wedge, and including the step of partially preventing closing movement of said valve stem via said wedge.

11. Process according to claim 10, including providing a movable first wedge connected to said valve stem and a movable second wedge engagable with said first wedge, and partially preventing closing movement of said valve stem by engaging said first and second wedges.

12. Process according to claim 1, including the step of employing a cam to move said movable stop means in relation to said valve stem.

13. Injection molding apparatus, which comprises:

a hot runner injection nozzle having a valve gate through which melt is injected into a mold cavity;

a valve stem movable in said injection nozzle between an open position permitting flow of melt through said gate and a closed position blocking flow of melt through said gate; and a double acting air piston operative to move said valve stem between the open and closed positions;

stop means for holding said valve stem at least at one position between the open and closed positions during flow of said melt through said gate restricting the flow of melt through said gate;

moving means separate from said double acting air piston for moving said stop means to a holding position and the movement of said stop means moving said valve stem from the open position to said at least one position and holding the valve stem at said at least one position; and adjustable motor means separate from said double acting air piston for moving said stop means bidirectionally in relation to said valve stem, said adjustable motor means setting the holding position of said stop means at any predetermined position which directly relates to said at least one position between the open and closed positions of said valve stem which has been predetermined.

a double acting air piston operative to move said valve stem between the open and closed positions;

stop means for holding said valve stem at least at one position between the open and closed positions during flow of said melt through said gate restricting the flow of melt through said gate;

moving means separate from said double acting air piston for moving said stop means to a holding position and the movement of said stop means moving said valve stem from the open position to said at least one position and holding the valve stem at said at least one position; and adjustable motor means separate from said double acting air piston for moving said stop means bidirectionally in relation to said valve stem, said adjustable motor means setting the holding position of said stop means at any predetermined position which directly relates to said at least one position between the open and closed positions of said valve stem which has been predetermined.

14. Injection molding apparatus according to claim 13, including at least two of said injection nozzles, valve stems and stop means, for injecting melt into a single mold cavity.

15. Injection molding apparatus according to claim 13, wherein said stop means is operative to block upward movement of said valve stem, and wherein said moving means moves said stop means and thereby moves said valve stem to said at least one position.

16. Injection molding apparatus according to claim 13, including a separate stop means and a separate moving means for each of at least two injection nozzles for separate adjusting of each stop means in relation to said valve stems.

17. Injection molding apparatus according to claim 13, wherein said valve stem includes an upper portion and wherein said stop means is operative to contact said upper portion.

18. Injection molding apparatus according to claim 13, wherein said adjustable motor means is a mechanical actuator.

19. Injection molding apparatus according to claim 13, wherein said adjustable motor means includes a worm that engages and drives a gear that in turn moves the stop means.

20. Injection molding apparatus according to claim 13, wherein said moving means includes an air piston connected to said stop means.

21. Injection molding apparatus according to claim 19, wherein said at least one position is set by said worm and gear, and said moving means includes an air piston connected to said stop means for moving the stop means during molding.

22. Injection molding apparatus according to claim 13, wherein said moving means includes a wedge for partially preventing closing movement of said valve stem.

23. Injection molding apparatus according to claim 22, including a movable first wedge connected to said valve stem and a movable second wedge engagable with said first wedge to partially block closing movement of said valve stem.

24. Injection molding apparatus according to claim 13, wherein said moving means includes a cam.

* * * * *

UNITED STATES PATENT AND TRADEMARK OFFICE
CERTIFICATE OF CORRECTION

PATENT NO.   : 6,228,309 B1
DATED        : May 8, 2001
INVENTOR(S)  : Jones et al.

It is certified that error appears in the above-identified patent and that said Letters Patent is hereby corrected as shown below:

Column 7, claim 13,
Lines 43-52, delete text

Column 8, claim 13,
Lines 1-10, delete text
(this repeats column 7, lines 23-42).

Signed and Sealed this

Eighth Day of January, 2002

Attest:

JAMES E. ROGAN
Attesting Officer                Director of the United States Patent and Trademark Office